US010204291B2

(12) United States Patent
Lin et al.

(10) Patent No.: US 10,204,291 B2
(45) Date of Patent: Feb. 12, 2019

(54) SYSTEM, METHOD, AND RECORDING MEDIUM FOR DETECTING EVENTS FOR INTEREST FROM MOBILE

(71) Applicant: International Business Machines Corporation, Armonk, NY (US)

(72) Inventors: Chung-Ching Lin, White Plains, NY (US); Sharathchandra U. Pankanti, Darien, CT (US); John R. Smith, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 14/840,293

(22) Filed: Aug. 31, 2015

(65) Prior Publication Data
US 2017/0061243 A1    Mar. 2, 2017

(51) Int. Cl.
| | | |
|---|---|---|
| G06K 9/62 | (2006.01) | |
| G06K 9/00 | (2006.01) | |
| H04N 5/232 | (2006.01) | |
| H04N 5/262 | (2006.01) | |

(52) U.S. Cl.
CPC ......... *G06K 9/629* (2013.01); *G06K 9/00758* (2013.01); *G06K 9/6215* (2013.01); *H04N 5/23238* (2013.01); *H04N 5/262* (2013.01)

(58) Field of Classification Search
CPC ......... G06T 3/4038; G06T 2207/10016; G06T 7/246; G06K 9/00261; G06K 9/00758; G06K 9/6215; G06K 9/629
See application file for complete search history.

(56) References Cited

U.S. PATENT DOCUMENTS

| | | | |
|---|---|---|---|
| 2004/0004659 A1* | 1/2004 | Foote | H04N 5/262 348/36 |
| 2005/0226531 A1* | 10/2005 | Silverstein | G06T 3/00 382/284 |
| 2009/0259633 A1* | 10/2009 | Bronstein | G06F 17/30799 |
| 2014/0240453 A1* | 8/2014 | Kim | H04N 5/2258 348/38 |
| 2014/0281982 A1* | 9/2014 | Clark | G06F 3/0481 715/716 |
| 2015/0082187 A1 | 3/2015 | Wallters et al. | |
| 2015/0334283 A1* | 11/2015 | Vranceanu | G06T 5/003 348/239 |

FOREIGN PATENT DOCUMENTS

| | | |
|---|---|---|
| WO | WO 2004/066631 A1 | 8/2004 |
| WO | WO 2004/066632 A1 | 8/2004 |

* cited by examiner

*Primary Examiner* — Obafemi O Sosanya
(74) *Attorney, Agent, or Firm* — Rahan Uddin, Esq.; McGinn IP Law Group, PLLC

(57) ABSTRACT

A discrepancy detection system for detecting a discrepancy between a plurality of video images of a same scene captured by an imaging device at different times, the system including a correspondence point detection device configured to detect corresponding points matching each other between a first video image sequence of the plurality of video images and a second video image sequence of the plurality of video images and a comparison device configured to compare image content of the first video image sequence and the second video image sequence for the discrepancy in the image content between the first video image sequence and the second video image sequence.

5 Claims, 10 Drawing Sheets

SYSTEM, METHOD, AND RECORDING MEDIUM FOR DETECTING EVENTS FOR INTEREST FROM MOBILE

This invention was made with Government support under Contract No.: HR0011-13-C-0022 awarded by Defense Advanced Research Projects Agency (DARPA). The Government has certain rights in this invention.

BACKGROUND

The present invention relates generally to image processing, and more particularly, but not by way of limitation, relating a system, a method, and a recording medium including of two or more videos taken of a scene at different times and determining a change event (i.e., discrepancy) of detection between the two or more videos.

UAVs (Unmanned Aerial Vehicles) and bodycams are emerging as de facto imaging method for many applications including defense, surveillance, asset management. Surveillance and reconnaissance tasks are currently often performed using an airborne platform such as a UAV. The airborne platform can carry different sensors. EO/IR cameras can be used to view a certain area from above. To support the task from the sensor analyst, different image processing techniques can be applied on the data, both in real-time or for forensic applications. Effective summarization of view of the multiple cameras on an (unmanned) aerial vehicle is of great importance in such uses. Additionally, a method of stitching images provided by such UAVs is needed.

Stitching images for use in visual analytic business is of great importance. For example, creating a panoramic view from video sequences from multiple cameras is a critical component for many analytic applications including defense, surveillance, asset management.

Algorithms for aligning and stitching images into seamless photo-mosaics are widely used in computer vision. One of the most important aspects of image stitching is to seamlessly blend overlapping images, even in the presence of parallax, lens distortion, and different scene illuminations, to provide a mosaic without any artifacts and that looks as natural as possible. Evidently, there is some subjectivity in interpreting how natural a panorama or a mosaic looks. Furthermore, the stitching techniques must be able to extrapolate well to the regions of the panorama where there is information only from a single image.

Therefore, it is desirable to provide an improved way to detect a discrepancy between a plurality of videos captured of a same scene at different times and the stitched images thereof to provide the discrepancy between the videos as an output.

SUMMARY

In view of the foregoing and other problems, disadvantages, and drawbacks of the aforementioned background art, an exemplary aspect of the disclosed invention provides a discrepancy detection system, method, and non-transitory recording medium for detecting a discrepancy between a plurality of videos captured of a same scene at different times.

In an exemplary aspect, the present invention provides a discrepancy detection system, a method, and a recording medium for detecting discrepancies between a plurality of videos captured of a same scene at different times, the system including a correspondence point detection device configured for detecting corresponding points matching each other between a first video of the plurality of videos and a second video of the plurality of videos and a comparison device configured for comparing image content of the first video image sequence and the second video image sequence for the discrepancy in the image content between the first video image sequence and the second video image sequence.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

It is to be understood that specific examples of UAV's and bodycams have been given for exemplary embodiments but the invention can be applied to any camera device that is moving. For example, the inventions can be applied to a mobile phone which was used to develop FIGS. 2-5. More specifically, in the present invention, it is more than that the image itself is moving but that the device that is taking the video is actually moving (i.e., mounted on a mobile platform).

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
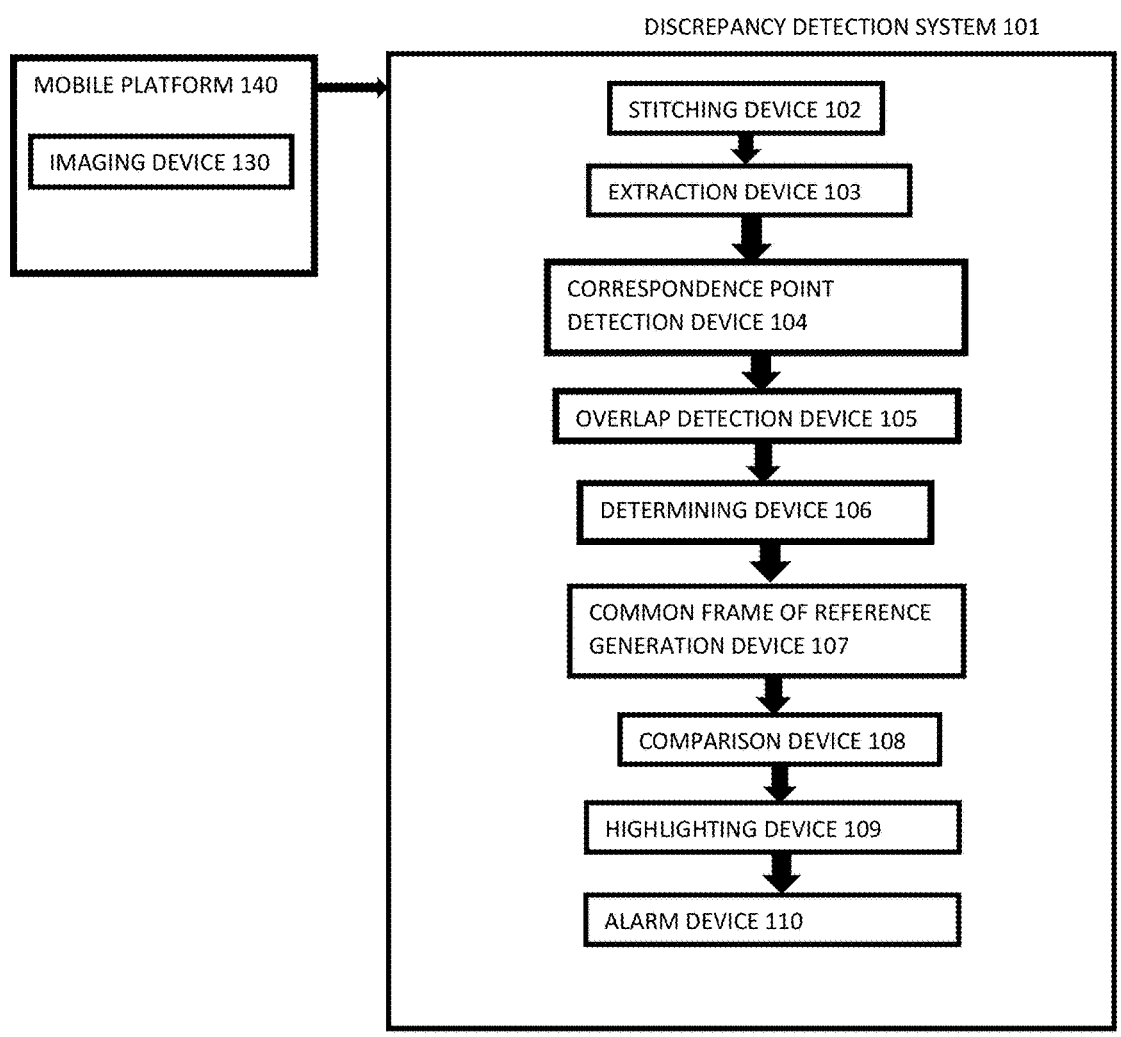
FIG. 1 exemplarily shows a block diagram illustrating a configuration of a discrepancy detection system according to an exemplary embodiment of the present invention.

The invention will now be described with reference to the drawing Figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

With reference now to FIG. 1, the discrepancy detection system 101 comprises a stitching device 102, an extraction device 103, a correspondence point detection device 104, an overlap detection device 105, a determining device 106, a common frame of reference generation device 107, a comparison device 108, a highlighting device 109, and an alarm device 110.

Figure 7:
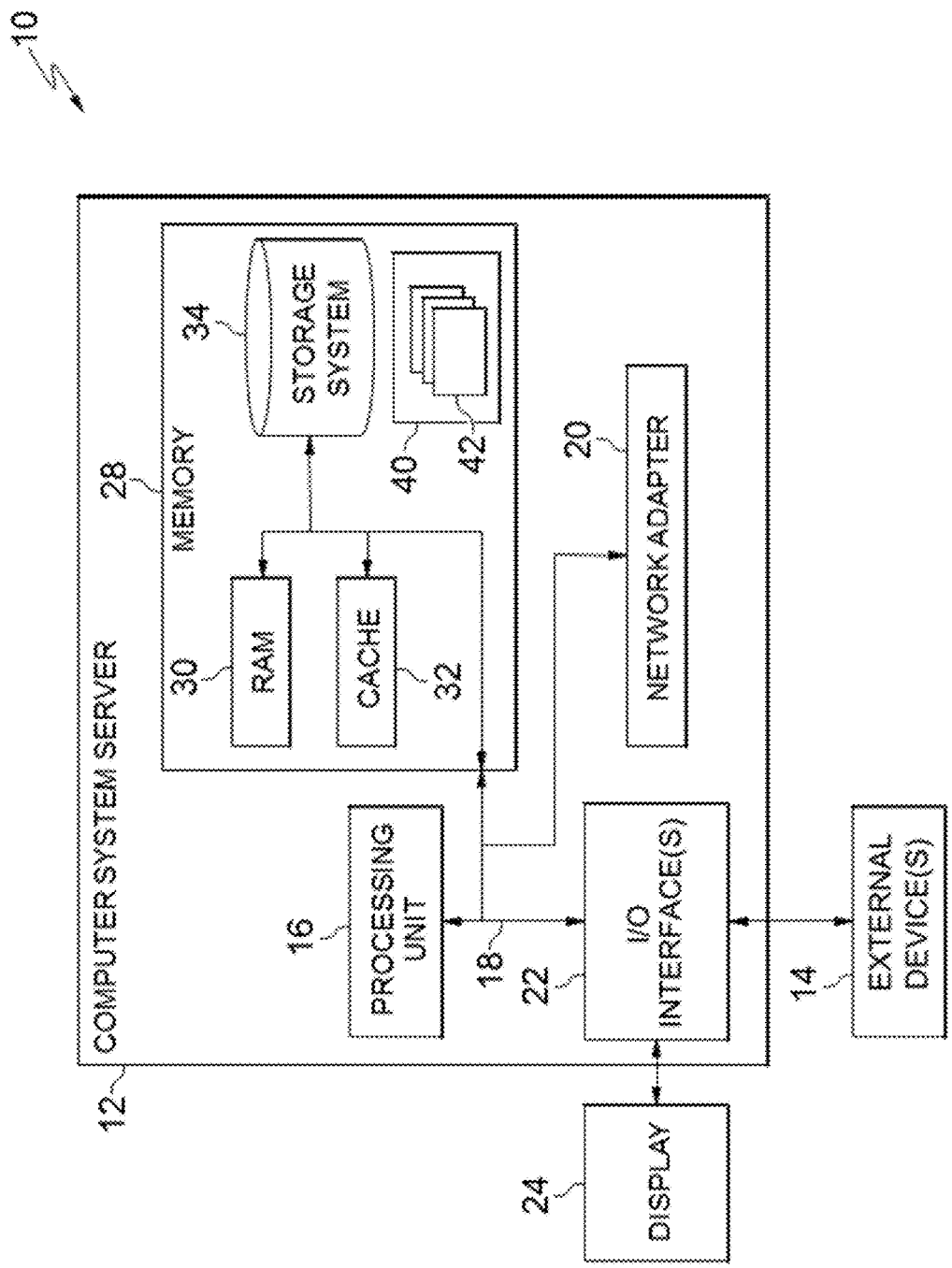
FIG. 7 depicts a cloud computing node according to an embodiment of the present invention.
Figure 8:
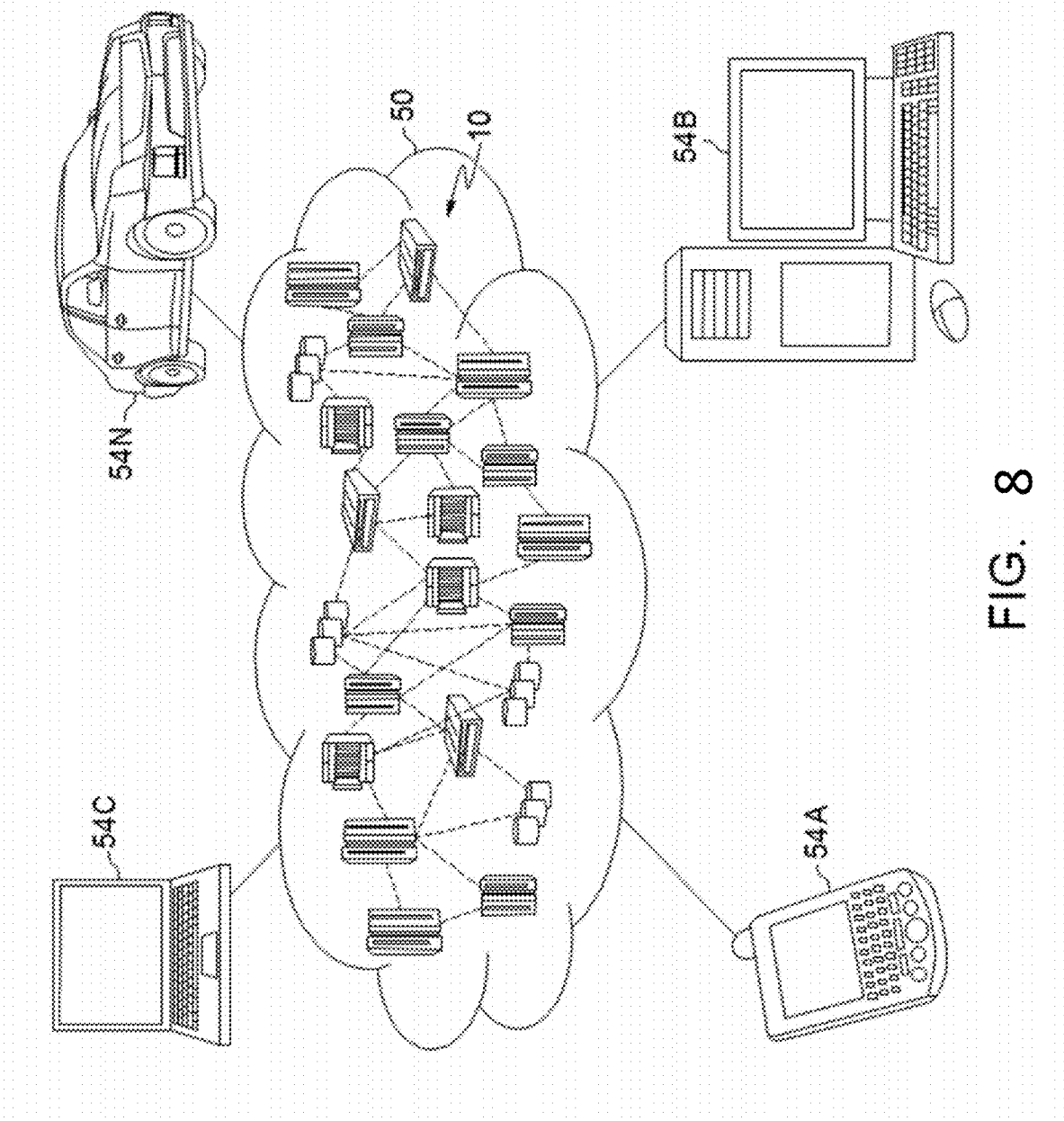
FIG. 8 depicts a cloud computing environment according to an embodiment of the present invention.
Figure 9:
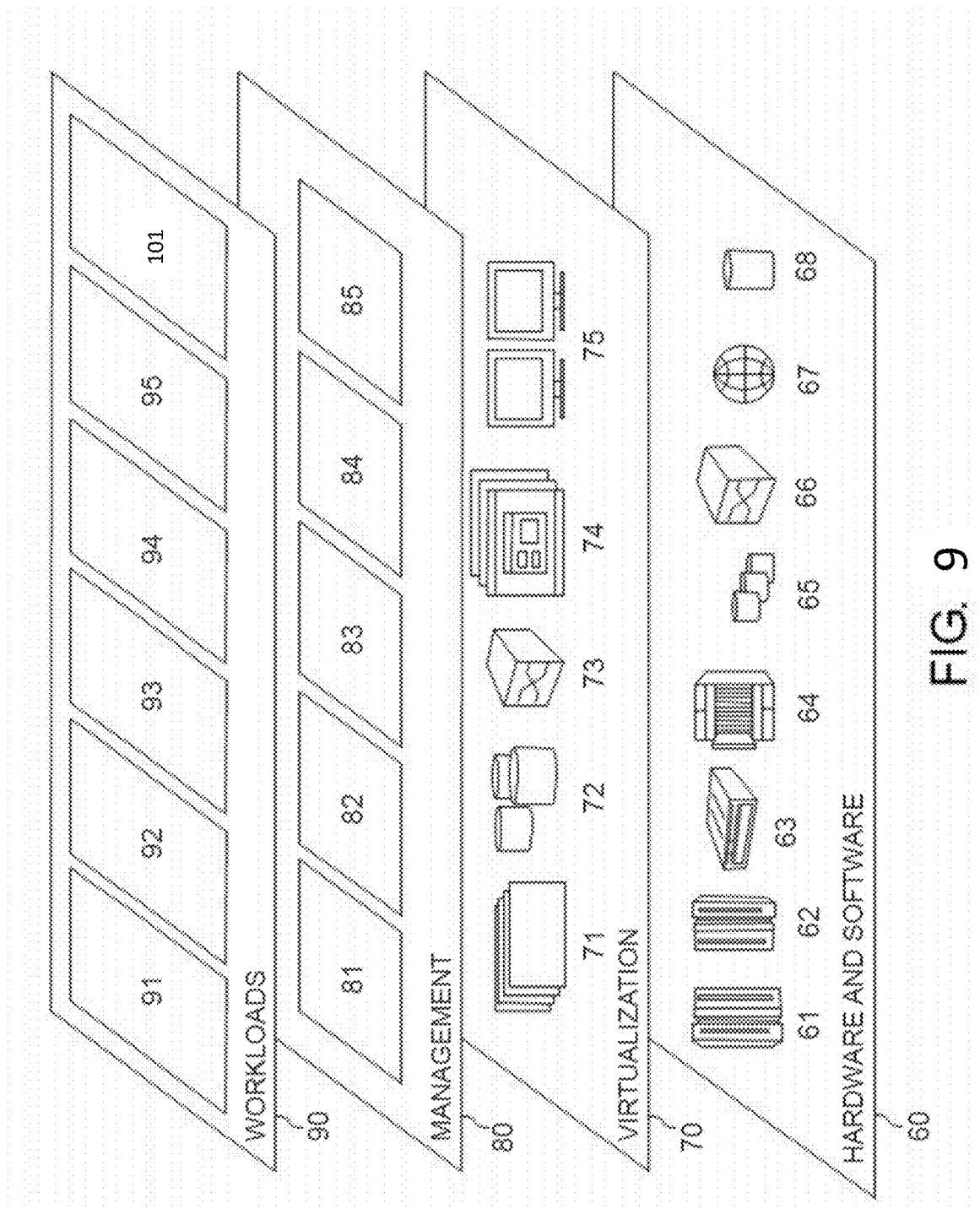
FIG. 9 depicts abstraction model layers according to an embodiment of the present invention.

Although as shown in FIGS. 7-9 and as described later, the computer system/server 12 is exemplarily shown in cloud computing node 10 as a general-purpose computing device which may execute in a layer the discrepancy detection system 101 (FIG. 9), it is noted that the present invention can be implemented outside of the cloud environment.

The discrepancy detection system 101 receives a plurality of input videos from an imaging device 130. The imaging device 130 can be disposed on a mobile platform 140 such as, and not limited thereto, a UAV or a bodycam. The video is taken from a mobile platform 140 such that the mobile platform 140 is moving while the video is being taken. The imaging device 130 captures a plurality of video images of a same scene at different times. The imaging device 130 disposed on the mobile platform 140 outputs the plurality of video images into the discrepancy detection system 101.

The stitching device 102 processes each video image of the plurality of video images to stitch a sequence of images into a single panorama image corresponding to each video sequence of images taken of a same scene at a specific time.

Figure 2A:
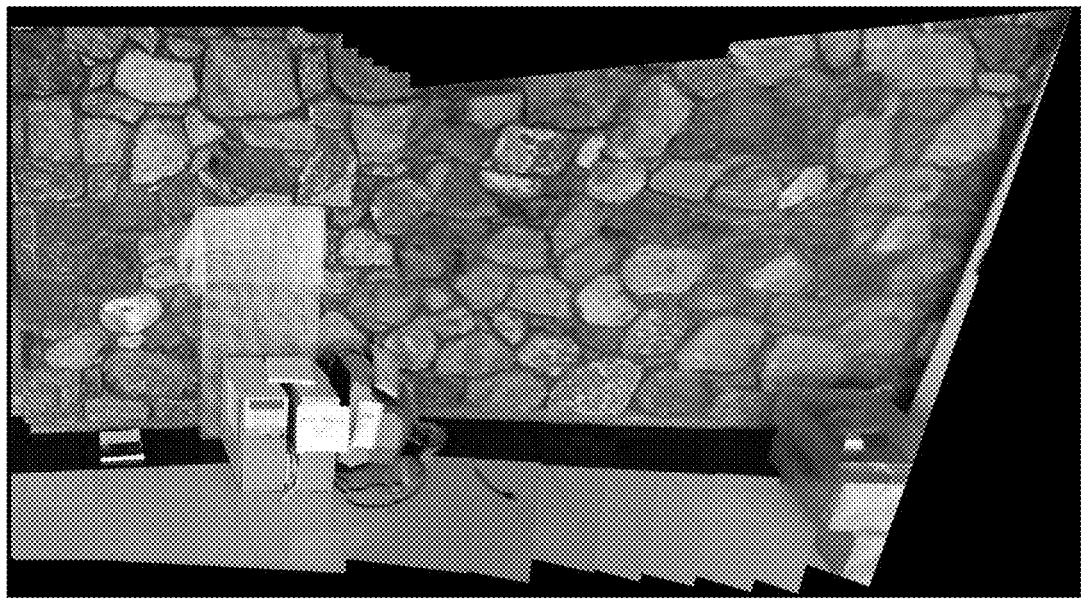
FIG. 2(a) exemplarily shows a stitching result by the stitching device 102 from a first video sequence of images taken of a scene at a first time.
Figure 2B:
FIG. 2(b) exemplarily shows a stitching result by the stitching device 102 from a second video sequence of images taken of a scene at a second time.

As exemplarily shown in FIG. 2(*a*), a stitching result by the stitching device 102 is depicted of the stitching a sequence of images of a first video sequence taken of a scene at a first time.

FIG. 2(*b*) exemplarily shows a stitching result by the stitching device 102 stitching a sequence of images of a second video sequence taken of the scene at a second time. As can be seen, FIG. 2(*b*) includes a chair that the discrepancy detection system will detect (as later described in more detail). The two video sequences have been taken at different times by the imaging device 130.

Several mechanisms can be used on the stitching field during image alignment, including tolerance to parallax. The previously disclosed invention of U.S. patent application Ser. No. 14/732,345, the entire contents of which is incorporated herein by reference, disclosed an invention that included a new method that incorporated several mechanisms to make the resulting panorama look more accurate in order to depict the actual image. To mitigate perspective distortion that occurs in the conventional As-Projective-As-Possible (APAP) related art, the disclosed invention linearizes the homography in the regions that do not overlap with any other image, and then automatically estimates a global similarity transform using a subset of corresponding points in overlapping regions. Further, that disclosed invention extrapolated smoothly between the homography and the global similarity in the overlapping regions, using the linearized homography (affine) and the global similarity transform in the non-overlapping regions. The smooth combination of two stitching fields (e.g., using homography/linearized homography and global similarity) enables the stitching device 102 of the instant Application to produce (a) a fully continuous and smooth stitching field with no bending artifacts, (b) improved perspective in the non-overlapping regions using a global similarity transform, and (c) full benefits of the state-of-the-art alignment accuracy, as offered by APAP.

A detailed presentation of a method of U.S. patent application Ser. No. 14/732,345 is provided in the following. First, the moving DLT method to estimate the local homography is described, and an approach to linearize it in the non-overlapping regions is provided. Then, the computation of a global similarity transformation between the reference and the target images is explained. Since many similarity transformations are possible, the disclosed invention of U.S. patent application Ser. No. 14/732,345 automatically choose the one with the lowest rotation angle as the best candidate. Finally, the details of the warp, which is constructed by combining the homography or its linearized version across the whole image with the global similarity, are presented.

An example aspect of the stitching device 102 is to provide stitching for a plurality of views of a scene, including extracting points of interest in each view to comprise of a point set from each of the plurality of image views of the scene, matching the points of interest and reducing outliers, grouping the matched points of interest in a plurality of groups, determining a similarity transformation with smallest rotation angle for each grouping of the matched points, generating virtual matching points on non-overlapping area of the plurality of image views, generating virtual matching points on overlapping area for each of the plurality of image views, and calculating piecewise projective transformations for the plurality of image views.

The points of interest representations can be translational invariant representations of edge orientations. The points of interest representations can be scale invariant feature transform (SIFT) points. The method can be stored in a non-transitory computer readable medium and executed by a processor. The plurality of views of a scene are remotely captured from an aerial view. Each group of the matched plurality points is used to calculate an individual similarity transformation, and then the rotation angles corresponding to the transformations are examined, and the one with the smallest rotation angle is selected. When extracting the points of interest, for each of the plurality of views, key points and texture descriptors are found.

The processor of the stitching device 102 of the present invention calculates piecewise projective transformations for the plurality of image views on overlapping areas. The processor determines the similarity transformation with a smallest rotation angle for each grouping of the match points. The processor calculates linearized transformations for the plurality of image views. The processor uses weighted linearized transformations to extrapolate non-overlapping areas. The processor generates virtual matching points on non-overlapping area of the plurality of image views, and the processor generates virtual matching points on overlapping area for each of the plurality of image views. The points of interest representations are translation-invariant representations of edge orientations. The points of interest representations are scale invariant feature transform (SIFT) points. The plurality of views of a scene are remotely captured from an aerial view and stored on the non-transitory computer readable medium for execution by the processor. Each group of the matched plurality points is used to calculate an individual similarity transformation, then the rotation angles corresponding to the transformations are examined and the one with the smallest rotation angle is selected by the processor.

A user interface provides interaction with overlays to see the details of objects and activities including the original video. The activities are tracks, the common reference is related to a geographic map, and a user interface can query and search the objects and activities. A system including a non-transitory computer readable medium and a processor can execute the method of the disclosed invention.

The stitching device 102 outputs the plurality of panorama images corresponding to each video sequence taken of a same scene at a different time to the extraction device 103. For purposes of illustration, the stitching device of the exemplary embodiment discussed below outputs a first panorama image and a second panorama image. However, the stitching device is not limited to outputting two panorama images. The extraction device 103 extracts feature points from the first panorama image and the second panorama image of the plurality of panorama images. The feature points can be translational invariant representations of edge orientations. The feature points can be scale invariant feature transform (SIFT) points. The feature points can include corner points of the images that are stitched together by the stitching device 102.

The correspondence detection device 104 detects corresponding points matching each other between the first video and the second video of the plurality of videos input into the discrepancy detection system 101 from the imaging device 130.

More specifically, the correspondence point detection device 104 receives the first panorama image and the second panorama image from the extraction device 103 which has extracted feature points. The correspondence point detection device 104 detects corresponding points matching each other from the first panorama image and the second panorama image. The matching correspondence points include, for example, corner points of the panorama images formed by the stitching device 102. The process of edge detection and identifying corner points may be done according to conventional methods. As exemplarily shown in FIG. 3, the correspondence point detection device 104 locates corresponding points from the first panorama image to the second panorama image. The correspondence point detection device 104 exemplarily detects that a point on the second panorama image can match the point on the first panorama image if the point is, for example, rotated 30° and translated 30 pixels south.

In other words, the correspondence point detection device 104 detects the commonalities (corresponding points) between the first panorama image and the second panorama image. Based on the commonalities, and as described in more detail later, the discrepancy detection system 101 can detect the discrepancies between the images.

The overlap detection device 105 detects an overlap area between the first panorama image and the second panorama image based on the corresponding points that have been identified to match each other. As exemplarily shown in FIG. 4, the overlap detection device 105 detects an overlap area according to the corresponding points. That is to say, the overlap detection device 105 detects a first portion of the first panorama image taken at a first time that can overlap or be the same portion of the second panorama image taken at the second time.

Figure 3:
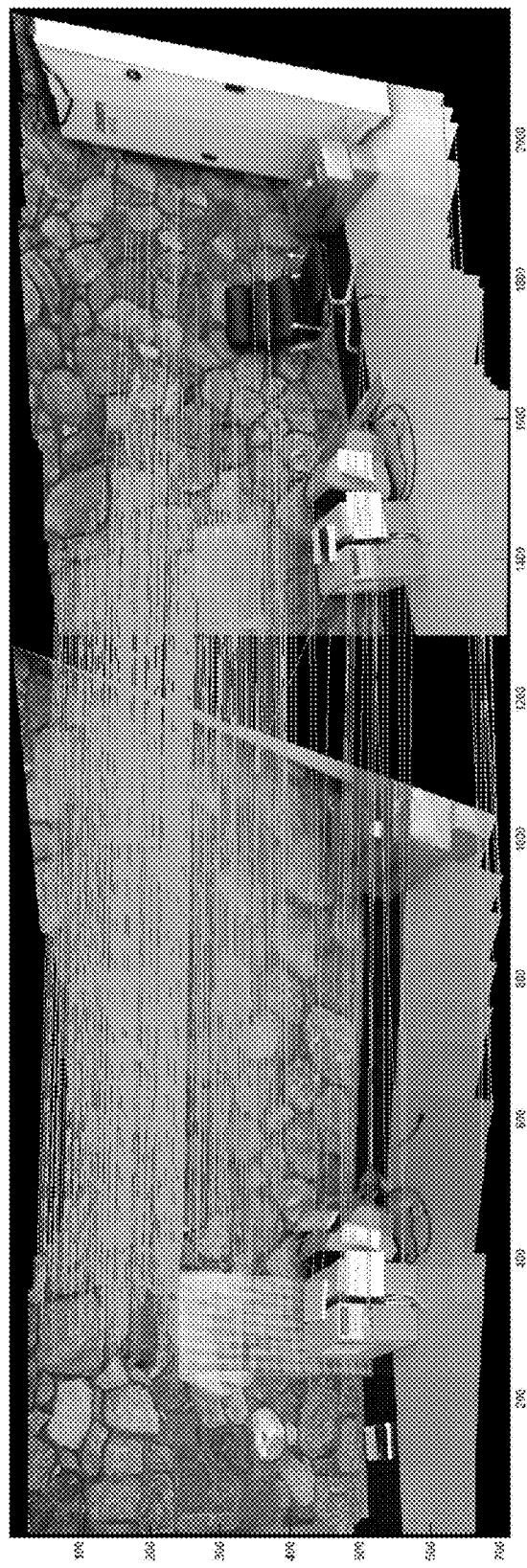
FIG. 3 exemplarily shows the correspondence point detection device 104 locating corresponding points from the first panorama image to the second panorama image based on matching corner points between the two panoramas.
Figure 4:
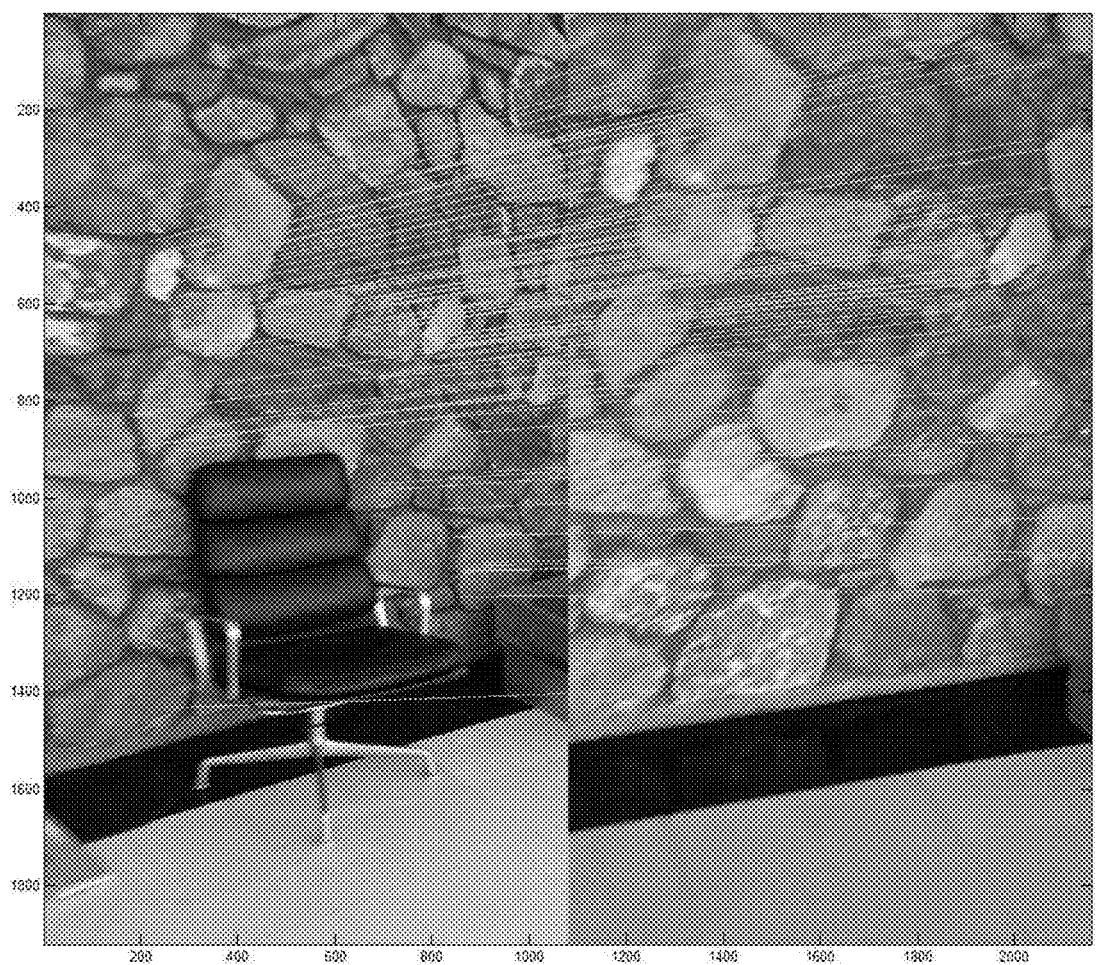
FIG. 4 exemplarily shows the overlap detection device 105 detecting an overlap area according to the corresponding points, as again based on matching corners between the panoramic images.
Figure 5:
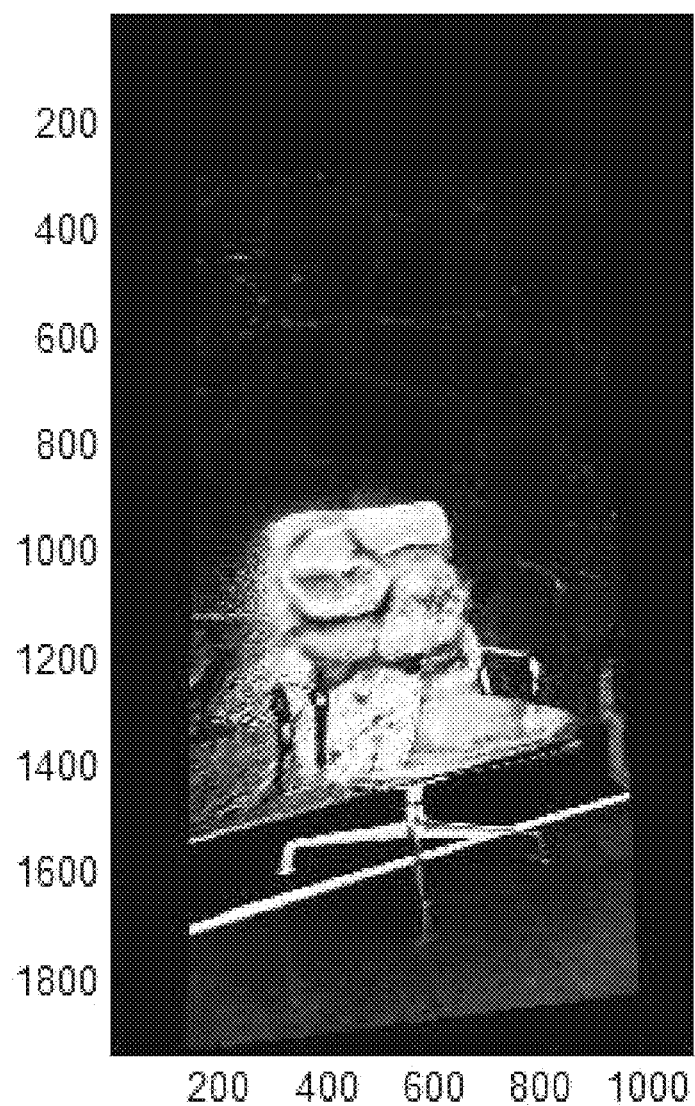
FIG. 5 exemplary shows a discrepancy between the first panorama image and the second panorama image.

FIGS. 3-5 show how panoramic images are aligned and compared based on searching for corresponding matching corners in the images.

As can be seen from FIG. 3, the first panorama image and the second panorama image can be geometrically transformed, displaced, warped, rotated, etc. since the videos are taken at different times. It should be noted that a geometric transformation is intended to include any of the preceding operations and synonyms thereof.

The determining device 106 determines the geometric transformation between the first panorama image and the second panorama image based on the corresponding points detected by the correspondence point detection device 104. More specifically, the determining device 106 determines a geometric transformation between the overlap portion of the first panorama image and the overlap portion of the second panorama image corresponding to the overlap area detected by the overlap detection device 105. The determining device 106 determines if the two portions are compatible to be compared.

The common frame of reference generation device 107 receives the determined geometric transformation between the overlap portion of the first panorama image and the overlap portion of the second panorama image and aligns contents of the first panorama image and the second panorama image into a common frame of reference. The common frame of reference generation device 107 performs the alignment of the contents by warping and transformation (i.e., displacing, rotating, etc.) the overlap portion of the two panorama images.

The comparison device 108 compares the aligned contents of the first panorama image and the second panorama image to determine if a discrepancy between the first panorama image and the second panorama image exists. The comparison can be made on the basis on the panorama images themselves or the underlying keyframes that best cover the overlapping portions of the first and second panorama image. In our embodiment, we use the keyframes as basis for the comparison. Before the comparison can be made effectively, the overlapping regions of the respective images (or keyframes, which we will refer to as first and second keyframe) may need to be transformed since raw pixel distributions in each picture may be different based on the illumination conditions and not appropriate for direct comparison. The transformation can be undertaken on many methods known. Once the overlapping images have been transformed to have comparable pixel appearance distribution statistics, the comparison device 108 subtracts the aligned overlapping portions of the images such that the foreground can be found. The subtraction result at each pixel in the overlapping regions in the first and second panorama (or keyframe) image can be done on an individual pixel-by-pixel basis or it can be based on a statistics of differences in groups of pixels surrounding the corresponding pixels in the first and second panorama (or keyframe) image. The comparison device 108 compares the panorama images, for example, by individual pixel-by-pixel basis. As exemplarily shown in FIG. 5, the comparison device 108 outputs the chair as the discrepancy between the first panorama image and the second panorama image.

The highlighting device 109 flags areas of discrepancy found by the comparison device 108 and highlights the discrepancy in the first panorama image and the second panorama image. In other words, the highlighting device 109 highlights the before and after discrepancy of the videos since the videos are taken of the same scene at a different time. As further exemplarily shown in FIG. 5, the highlighting device 108 highlights the discrepancy (i.e., the chair) between the first panorama image and the second panorama image.

The alarm device 110 generates an output signal to a user to alert if a discrepancy has been found by the discrepancy detection system 100.

The ability to identify discrepancies between multiple videos taken at different times has several applications, for example but not limited to, surveillance, inspection, security, retail, and consumer industry applications. That is, the exemplary embodiments described herein can replace the conventional "see something, say something" practice and systematically identify a discrepancy (for example, left baggage at an airport terminal) between a plurality of videos taken at different times. Or even further, the exemplary embodiments herein can identify new structures being built from UAV videos for defense and surveillance purposes.

Figure 6:
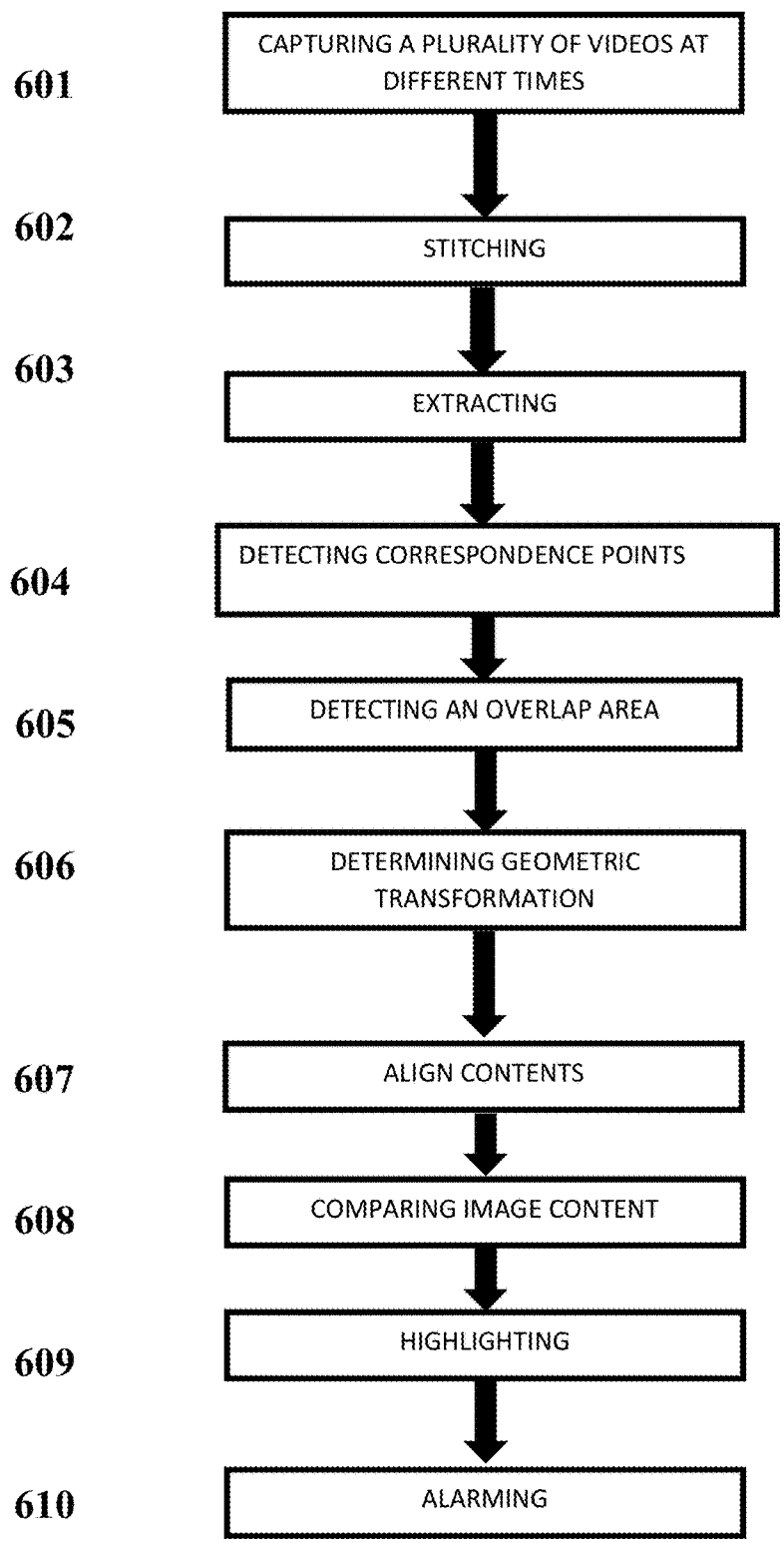
FIG. 6 exemplary shows a flow chart for a discrepancy detection method.

FIG. 6 shows a high level flow chart for a discrepancy detection method 600.

Step 601 captures a first video at a first time and captures a second video at a second time by the imaging device 130.

Step 602 stitches the first video of the plurality of videos into a first panorama image and the second video of the plurality of videos into a second panorama image captured at different times in step 601.

Step 603 extracts feature points from the first panorama image and the second panorama image stitched by the stitching step 602.

Step 604 detects corresponding points matching each other between the first video of the plurality of videos and the second video of the plurality of videos. More specifically, step 604 detects corresponding points matching each other from the first panorama image and the second panorama image. The matching correspondence points include corner points of the panorama images formed by the stitching step 602.

Step 605 detects an overlap area between the first panorama image and the second panorama image based on the corresponding points matching each other in step 604.

Step 606 determines a geometric transformation between an overlap portion of first panorama image and an overlap portion the second panorama image corresponding to the overlap area detecting in step 605.

Step 607 aligns contents of the first panorama image and the second panorama image into a common frame of reference using the geometric transformation between the overlap portion of the first panorama image and the overlap portion of the second panorama image.

Step 608 compares image content of the first video and the second video for the discrepancy in the image content between the first video and the second video. More specifically, step 608 can also compare the aligned contents of the first panorama image and the second panorama image for the discrepancy between the first panorama image and the second panorama image.

Step 609 highlights by flagging the discrepancy found by the comparing step 608 in the first panorama image and the second panorama image.

Step 610 sends an alarm signal to a user if a discrepancy is founds by the comparing step 608.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the discrepancy detection system 101 described herein.

It should be noted that the discrepancy detection system 101 is an extremely sophisticated system but can be adapted to conform to any system requirements and the capabilities of that specific system based on processing speed, memory, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A discrepancy detection system for detecting a discrepancy between a plurality of video images of a same scene captured by an imaging device at different times, the system comprising:
    a correspondence point detection device configured to detect corresponding points matching each other between a first video image sequence of the plurality of video images and a second video image sequence of the plurality of video images, the first video image sequence being different from the second video image sequence;
    a stitching device configured to stitch images of the first video image sequence of the plurality of video images into a first panorama image and to stitch images of the second video image sequence of the plurality of video images into a second panorama image;
    a comparison device configured to compare image content of the first video image sequence and the second video image sequence for the discrepancy in the image content between the first panorama image and the second panorama image of the same scene at the different times based on a relation to the corresponding points matching each other;
    an overlap detection device configured to detect an overlap area between the image content of the same scene at the different times between the first panorama image and the second panorama image based on the corresponding points matching each other, the discrepancy being the non-matching areas of the first panorama image and the second panorama image having captured image content different from each other; and an extraction device configured to extract feature points from the first panorama image and from the second panorama image, said feature points comprising corners, wherein the correspondence point detection device detects corresponding points matching each other from the first panorama image and from the second panorama image, and wherein the overlap detection device is further configured to detect a second overlap area between the first panorama image and the second panorama image based on the corresponding points matching each other, the discrepancy detection system further comprising:
  a determining device configured to determine a geometric transformation between an overlap portion of the first panorama image and an overlap portion of the second panorama image corresponding to the second overlap area; and
  a common frame of reference generation device configured to align contents of the first panorama image and the second panorama image by displacing and rotating the overlap portion into a common frame of reference using the geometric transformation between the overlap portion of the first panorama image and the second overlap portion of the second panorama image, wherein the comparison device compares the aligned contents of the first panorama image and the second panorama image for the discrepancy between the first panorama image and the second panorama image.

2. The discrepancy detection system according to claim 1, wherein the imaging device is disposed on a mobile platform, thereby the first and second video image sequences are taken from a moving image device.

3. The discrepancy detection system according to claim 1, further comprising:
  a highlighting device configured to flag the discrepancy found by the comparison device between the first video image sequence and the second video image sequence.

4. A discrepancy detection method for detecting a discrepancy between a plurality of video images of a same scene captured by an imaging device at different times, the method comprising:
  detecting corresponding points matching each other between a first video image sequence of the plurality of video images and a second video image sequence of the plurality of video images, the first video image sequence being different from the second video image sequence;
  stitching images of the first video image sequence of the plurality of video images into a first panorama image and to stitch images of the second video image sequence of the plurality of video images into a second panorama image;
  comparing image content of the first video image sequence and the second video image sequence for the discrepancy in the image content between the first panorama image and the second panorama image of the same scene at the different times based on a relation to the corresponding points matching each other;
  detecting an overlap area between the image content of the same scene at the different times between the first panorama image and the second panorama image based on the corresponding points matching each other, the discrepancy being the non-matching areas of the first panorama image and the second panorama image having captured image content different from each other; and
  extracting feature points from the first panorama image and from the second panorama image, said feature points comprising corners, wherein detecting detects corresponding points matching each other from the first panorama image and from the second panorama image, and wherein the detecting further detects a second overlap area between the first panorama image and the second panorama image based on the corresponding points matching each other, the method further comprising:
  determining a geometric transformation between an overlap portion of the first panorama image and an overlap portion of the second panorama image corresponding to the second overlap area; and
  aligning contents of the first panorama image and the second panorama image by displacing and rotating the overlap portion into a common frame of reference using the geometric transformation between the overlap portion of the first panorama image and the second overlap portion of the second panorama image, wherein the comparing compares the aligned contents of the first panorama image and the second panorama image for the discrepancy between the first panorama image and the second panorama image.

5. A non-transitory computer-readable recording medium recording a discrepancy detection program for detecting a discrepancy between a plurality of video images of a same scene as captured by an imaging device at different times, the program causing a computer to perform:
  detecting corresponding points matching each other between a first video image sequence of the plurality of video images and a second video image sequence of the plurality of video images, the first video image sequence being different from the second video image sequence;
  stitching images of the first video image sequence of the plurality of video images into a first panorama image and to stitch images of the second video image sequence of the plurality of video images into a second panorama image;
  comparing image content of the first video image sequence and the second video image sequence for the discrepancy in the image content between the first panorama image and the second panorama image of the same scene at the different times based on a relation to the corresponding points matching each other;
  detecting an overlap area between the image content of the same scene at the different times between the first panorama image and the second panorama image based on the corresponding points matching each other, the discrepancy being the non-matching areas of the first panorama image and the second panorama image having captured image content different from each other; and
  extracting feature points from the first panorama image and from the second panorama image, said feature points comprising corners, wherein detecting detects corresponding points matching each other from the first panorama image and from the second panorama image, and wherein the detecting further detects a second overlap area between the first panorama image and the second panorama image based on the corresponding points matching each other, the method further comprising:
- determining a geometric transformation between an overlap portion of the first panorama image and an overlap portion of the second panorama image corresponding to the second overlap area; and
- aligning contents of the first panorama image and the second panorama image by displacing and rotating the overlap portion into a common frame of reference using the geometric transformation between the overlap portion of the first panorama image and the second overlap portion of the second panorama image, wherein the comparing compares the aligned contents of the first panorama image and the second panorama image for the discrepancy between the first panorama image and the second panorama image.

* * * * *